(12) United States Patent
Builta et al.

(10) Patent No.: US 7,571,879 B2
(45) Date of Patent: Aug. 11, 2009

(54) AUTOMATIC CONVERSION SYSTEM FOR TILTROTOR AIRCRAFT

(75) Inventors: Kenneth E. Builta, Euless, TX (US);
Kynn J. Schulte, Arlington, TX (US);
James E. Harris, Dalworthington Gardens, TX (US); Billy K. Gore, Euless, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 352 days.

(21) Appl. No.: 11/524,887

(22) Filed: Sep. 22, 2006

(65) Prior Publication Data

US 2009/0114764 A1 May 7, 2009

(51) Int. Cl.
*G05D 1/00* (2006.01)
(52) U.S. Cl. ....................... 244/194; 244/7 R
(58) Field of Classification Search ............... 244/7 R, 244/194, 191, 175, 17.25, 17.13, 17.27, 17.23
See application file for complete search history.

(56) References Cited

U.S. PATENT DOCUMENTS

| 6,644,588 | B2 * | 11/2003 | King et al. ................. 244/7 A |
| 7,137,591 | B2 * | 11/2006 | Carter et al. ............. 244/17.27 |
| 7,448,571 | B1 * | 11/2008 | Carter et al. ............. 244/17.25 |
| 2004/0232280 | A1 * | 11/2004 | Carter et al. ............. 244/17.25 |

OTHER PUBLICATIONS

"Design of Tiltrotor Flight Control System Using Optical Control." Fan Yonghua and Yang Jun. Proceedings of the 26th Chinese Control Conference, Jul. 26-31, 2007.*
"Active Control of Flight Path and Critical Loads in Tilt-Rotor Aircraft." Daniel J Walker and Mark Kairaj Voskuijl. American Helicopter Society 63rd Annual Forum. May 1-3, 2007.*
"Adaptive Model Inversion Flight Control for Tiltrotor Aircraft." Anthony J Calise and Rolf T Rysdyk. AIAA Guidance, Navigation and Control Conference, Aug. 1997.*

* cited by examiner

*Primary Examiner*—Michael R Mansen
*Assistant Examiner*—Michael Kreiner
(74) *Attorney, Agent, or Firm*—Pillsbury Winthop Shaw Pittman LLP

(57) ABSTRACT

One embodiment of the present invention is a method for automatically controlling the conversion of a tiltrotor aircraft. An airspeed command for the tiltrotor aircraft is received. The airspeed command is converted to a pylon position. A difference between the airspeed command and a measured airspeed is calculated. The difference between the airspeed command and a measured airspeed is converted to a dynamic pylon position. A total pylon position is calculated from the pylon position and the dynamic pylon position. A pylon of the tiltrotor aircraft is moved to the total pylon position. Another embodiment of the present invention is a system for calculating a position of a pylon of a tiltrotor aircraft based on an airspeed command. The system includes an airspeed command module, a pylon trim position module, a dynamic pylon position module, and a pylon position module.

14 Claims, 3 Drawing Sheets

AUTOMATIC CONVERSION SYSTEM FOR TILTROTOR AIRCRAFT

BACKGROUND OF THE INVENTION

1. Field of the Invention

Embodiments of the present invention relate to the conversion control of a tiltrotor aircraft from a helicopter configuration to an airplane configuration and from an airplane configuration to a helicopter configuration. More particularly, embodiments of the present invention relate to systems and methods for automatically controlling the pylon positions of a tiltrotor aircraft based on a commanded airspeed, a commanded rate of change of airspeed, and whether the commanded airspeed is increasing or decreasing.

2. Background Information

A tiltrotor aircraft is generally an aircraft that can fly like a helicopter or like a propellered airplane, depending on the position of its rotors. A tiltrotor aircraft typically has at least one wing and at least two rotors located at either end of the wing. Each rotor is connected to a pod and each pod is, in turn, connected to the wing.

The pods are used to position each rotor relative to the wing. A pod that encloses one or more engines powering the rotor connected to the pod and positions the engine in addition to the rotor is called a nacelle. A pod that does not contain an engine powering the rotor connected to the pod is called a pylon. The term "pylon" is hereinafter used to refer to a pod, a nacelle, or a pylon.

A tiltrotor aircraft can be flown like a helicopter by generally positioning the pylons of the aircraft relative to the wing so that the rotors rotate about a generally vertical axis and in a horizontal plane. A tiltrotor can be flown like a propellered airplane by generally positioning the pylons of the aircraft so that the rotors rotate about a horizontal axis and in a vertical plane. The process of changing the position of the pylons of a tiltrotor aircraft between the vertical position (helicopter configuration) and the horizontal position (airplane configuration) or the horizontal position and the vertical position during flight is called conversion.

Conversion is typically a manual process on tiltrotor aircraft. The pilot controls the conversion process by using a pylon switch on a collective control grip or power control grip of the aircraft. This pylon switch has a center off position, a forward position for converting from helicopter to airplane configuration, and an aft position for converting from airplane to helicopter configuration. The pylon actuators are run at a specified speed while the pylon switch is held in either position by the pilot. In another configuration, the pylon switch includes a position for emergency rapid conversion back to a helicopter. In still another configuration, the pylons are driven to discrete preset positions when a pilot operates the pylon switch.

In view of the foregoing, it can be appreciated that a need exists for systems and methods that can automatically control the pylon positions of a tiltrotor aircraft during conversion.

BRIEF SUMMARY OF THE INVENTION

One embodiment of the present invention is a method for automatically controlling the conversion of a tiltrotor aircraft. An airspeed command for the tiltrotor aircraft is received. The airspeed command is converted to a pylon position. A difference between the airspeed command and a measured airspeed is calculated. The difference between the airspeed command and a measured airspeed is converted to a dynamic pylon position. A total pylon position is calculated from the pylon position and the dynamic pylon position. A pylon of the tiltrotor aircraft is moved to the total pylon position.

Another embodiment of the present invention is a method for calculating a position of a pylon of a tiltrotor aircraft based on an airspeed command. An airspeed command signal for the tiltrotor aircraft is received. The airspeed command signal is converted to the airspeed command. The airspeed command is converted to a pylon trim position. An airspeed error is calculated from a difference between the airspeed command and a measured airspeed. The airspeed error is converted to a dynamic pylon position. The position of the pylon is calculated from the pylon trim position and the dynamic pylon position.

Another embodiment of the present invention is a system for calculating a position of a pylon of a tiltrotor aircraft based on an airspeed command. The system includes an airspeed command module, a pylon trim position module, a dynamic pylon position module, and a pylon position module. The airspeed command module receives an airspeed command signal for the tiltrotor aircraft and converts the airspeed command signal to the airspeed command. The pylon trim position module receives the airspeed command from the airspeed command module and converts the airspeed command to a pylon trim position. The dynamic pylon position module receives the airspeed command from the airspeed command module, calculates an airspeed error from a difference between the airspeed command and a measured airspeed, and converts the airspeed error to a dynamic pylon position. The pylon position module receives pylon trim position from the pylon trim position module and the dynamic pylon position from the dynamic pylon position module and calculates the position of the pylon from the pylon trim position and the dynamic pylon position.

Figure 1:
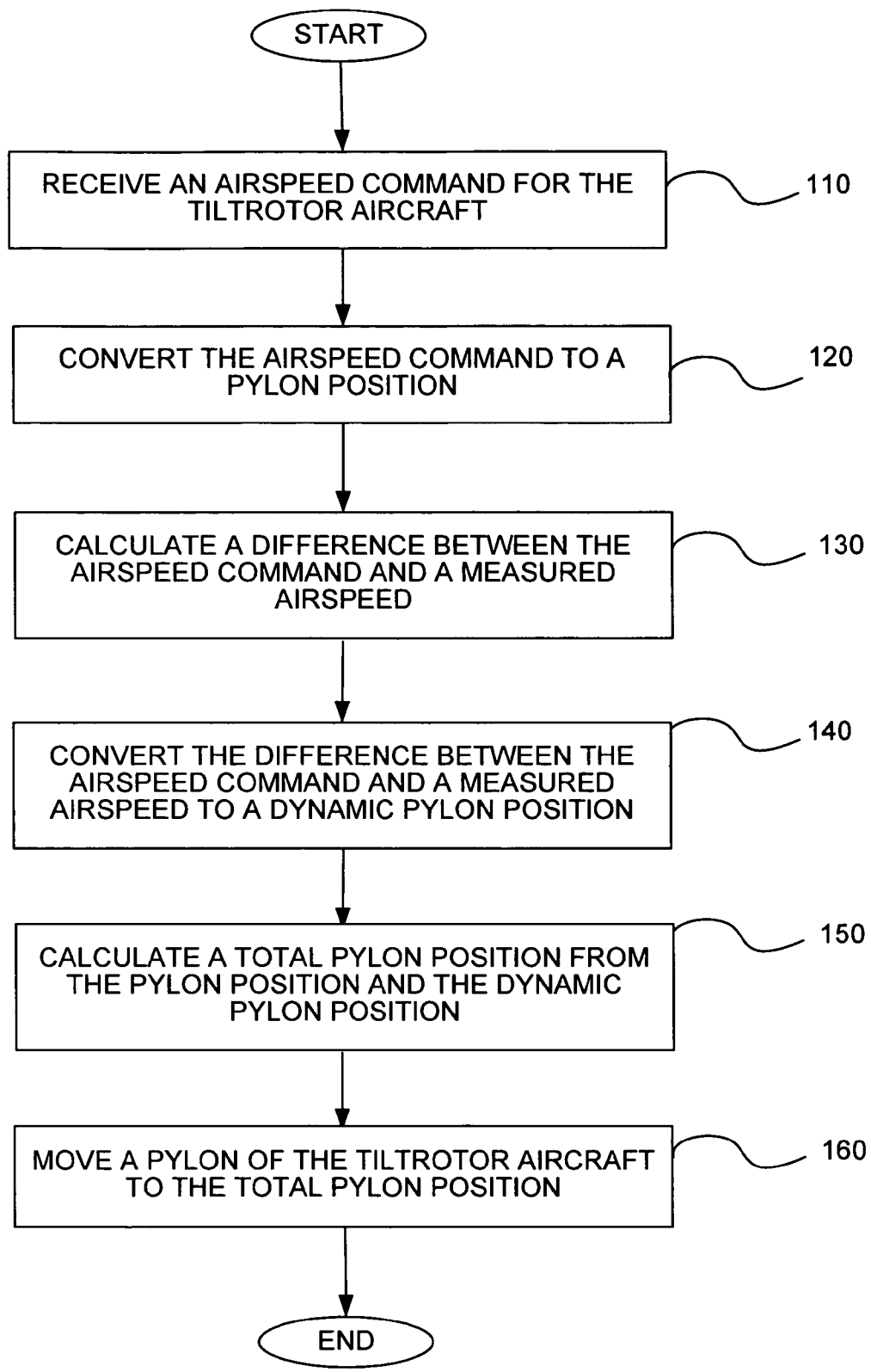
FIG. 1 is a flowchart showing a method for automatically controlling the conversion of a tiltrotor aircraft, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

One embodiment of the present invention is a method for controlling the conversion of a tiltrotor aircraft from a helicopter to an airplane configuration, and from an airplane to helicopter configuration. The pylon positions are driven based on several important parameters. These parameters include the commanded airspeed, the commanded rate of change of the airspeed, and whether the airspeed is increasing or decreasing.

The pylon positions of a tiltrotor aircraft are controlled automatically by driving the pylons to the positions that are best for each flight condition. There is an airspeed schedule that produces a pylon trim position for each value of calibrated airspeed. This airspeed schedule is referred to as the pylon trim schedule. At low airspeeds, the pylons are near the vertical position to provide the vertical thrust required for hover and low speed flight. As the airspeed command increases, the pylons are driven forward to provide the forward thrust required for that particular airspeed, while continuing to provide the required vertical thrust. The pylon trim schedule also controls the maximum rate of change of airspeed as a function of airspeed.

There are different pylon trim schedules for increasing and decreasing airspeeds. Since acceleration and deceleration characteristics of tiltrotors are different, an additional deceleration schedule is provided that alters the trim schedule proportional to the level of deceleration. The higher the deceleration, the larger is the change from the trim schedule. The deceleration schedule allows the pylon to drive further toward helicopter configuration during decelerations than could be achieved only with the trim schedule.

In addition to the pylon trim schedules that command pylon position, there is also a dynamic pylon command that commands pylon positions dynamically. When the airspeed command is increased, it causes the airspeed error to increase, which drives the pylon dynamic control forward in addition to the pylon trim schedule command. This pylon dynamic control commands the pylon position to change with proportional plus integral gains to drive the airspeed error to zero. This dynamic pylon command is phased to zero as the pylons go closer to conversion down stops.

As the pylons approach the conversion down stops on the wings, the pylon positions are determined completely by the pylon trim schedule. When the pylons get near the down stops (i.e., three degrees), they are then driven at a slow constant velocity (i.e., one degree/second) into contact with the down stops. At this point, the conversion actuators engage a holding algorithm that holds a constant force against the down stops until they are commanded to come off of the down stops for conversion to helicopter configuration. When the airspeed command goes below the airplane range, then the pylons come off of the down stops and follow their schedules.

Tiltrotor aircraft can be manned or unmanned aircraft. Manned tiltrotor aircraft can be commanded by a pilot. Unmanned tiltrotor aircraft can be commanded by a ground control station (GCS) operator, a flight control box (FCB) operator, or by automatic means. Manned tiltrotor aircraft take airspeed commands from a command stick guided by a pilot.

In another embodiment of the present invention, flap positions, together with pylon positions, are controlled automatically to provide the optimum combination of pylon and flap positions for best aircraft operation. For each airspeed and pylon position during the conversion process, there is an optimum flap position that will optimize the conversion process. During the conversion process, flap positions are controlled as functions of both pylon position and airspeed. Generally flap position is controlled as a function of pylon position during the conversion process and as a function of both pylon position and airspeed in the airplane configuration.

FIG. 1 is a flowchart showing a method 100 for automatically controlling the conversion of a tiltrotor aircraft, in accordance with an embodiment of the present invention.

In step 110 of method 100, an airspeed command for the tiltrotor aircraft is received. The airspeed command is received, for example, by receiving control stick input from a pilot and converting it to the airspeed command. In another embodiment of method 100, the airspeed command is received by receiving control stick input from an operator of a flight control box and converting it to the airspeed command. In another embodiment of method 100, the airspeed command is received by. receiving a command from an operator of a ground control station and converting it to the airspeed command. In another embodiment of method 100, the airspeed command is received by receiving a command from a pre-programmed automated maneuver. A pre-programmed automated maneuver is, for example, an algorithm stored in the flight control computer. This algorithm, can include, but is not limited to a circle mode, a return mode, a stall recovery, and a navigational mode.

In step 120, the airspeed command is converted to a pylon position. The airspeed command is converted to a pylon position, for example, by searching a lookup table for the pylon position corresponding to the airspeed command. In another embodiment of method 100, if the tiltrotor aircraft is decelerating, the airspeed command is converted to a pylon position by searching a deceleration lookup table in addition to the lookup table for a deceleration pylon position corresponding to the airspeed command and calculating a difference between the pylon position obtained from the lookup table and the deceleration pylon position to produce the pylon position.

In step 130, a difference between the airspeed command and a measured airspeed is calculated.

In step 140, the difference between the airspeed command and a measured airspeed is converted to a dynamic pylon position.

In step 150, a total pylon position is calculated from the pylon position and the dynamic pylon position.

In step 160, a pylon of the tiltrotor aircraft is moved to the total pylon position.

In another embodiment of method 100, a flap position of the tiltrotor aircraft is controlled as a function of the total pylon position and the airspeed command. The flap position is controlled, for example, by searching a flap lookup table that is a function of the total pylon position, searching a flap lookup table that is a function of the airspeed command, and adding the pylon flap position and the airspeed flap position to produce the flap position.

Figure 2:
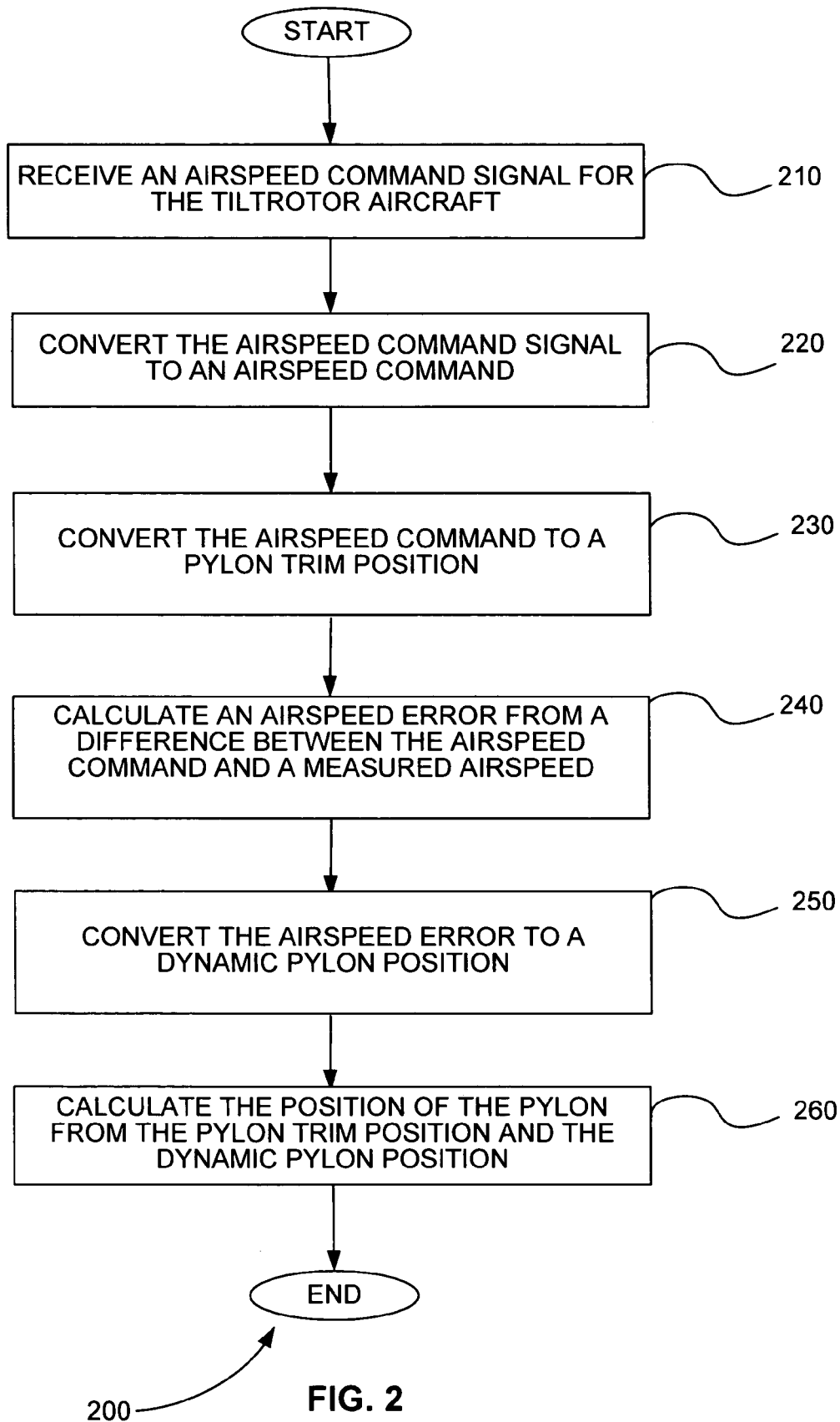
FIG. 2 is a flowchart showing a method for calculating a position of a pylon of a tiltrotor aircraft based on an airspeed command, in accordance with an embodiment of the present invention.

FIG. 2 is a flowchart showing a method 200 for calculating a position of a pylon of a tiltrotor aircraft based on an airspeed command, in accordance with an embodiment of the present invention.

In step 210 of method 200, an airspeed command signal for the tiltrotor aircraft is received. The airspeed command signal can be, but is not limited to, a control stick input from a pilot, a control stick input from an operator of an FCB, a command from an operator of a GCS, or a command from a pre-programmed automated maneuver.

In step 220, the airspeed command signal is converted to the airspeed command. If the airspeed command signal is a control stick input, the control stick input can command a rate of airspeed change that is then integrated to produce the airspeed command, for example. In another embodiment of method 200, if the airspeed command signal is a command from a GCS, a difference between the command and a previous airspeed command is calculated, the amplitude of the difference is limited below a maximum value and above a minimum value, and the difference is integrated to produce the airspeed command. In anther embodiment of method 200, the airspeed command signal is a command from a pre-programmed automated maneuver.

In step 230, the airspeed command is converted to a pylon trim position. If the tiltrotor is accelerating, a lookup table is searched for a lookup table pylon trim position corresponding to the airspeed command and the lookup table pylon trim position is rate limited to produce the pylon trim position, for example. In another embodiment of method 200, if the tiltrotor is decelerating, a lookup table is searched for a lookup table pylon trim position corresponding to the airspeed command, a deceleration lookup table is searched for a deceleration lookup table pylon trim position corresponding to the airspeed command, a difference between the lookup table pylon trim position and the deceleration lookup table pylon trim position is calculated, and the difference is rate limited to produce the pylon trim position.

In step 240, an airspeed error is calculated from a difference between the airspeed command and a measured airspeed.

In step 250, the airspeed error is converted to a dynamic pylon position. The airspeed error is converted to a dynamic pylon position, for example, by taking the difference between the airspeed command and the airspeed feedback to create an airspeed error, scaling the error to create a proportional command, scaling and integrating the error to create an integral command, and then summing the proportional command with the integral command to produce the dynamic pylon position.

In step 260, the position of the pylon is calculated from the pylon trim position and the dynamic pylon position. The position of the pylon is calculated, for example, from a difference between the pylon trim position and the dynamic pylon position.

Figure 3:
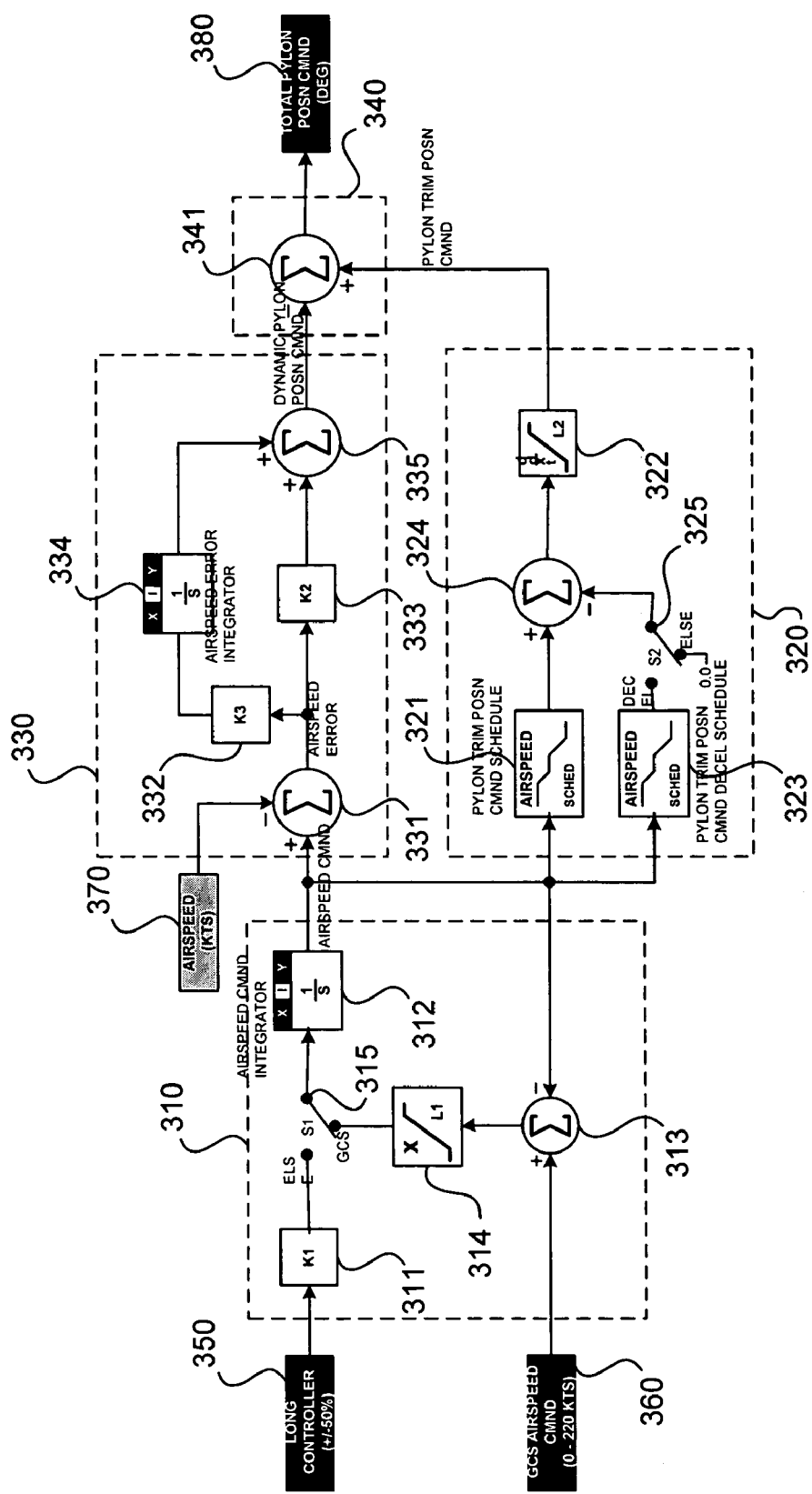
FIG. 3 is a schematic diagram of a system for calculating a position of a pylon of a tiltrotor aircraft based on an airspeed command, in accordance with an embodiment of the present invention.

FIG. 3 is a schematic diagram of a system 300 for calculating a position of a pylon of a tiltrotor aircraft based on an airspeed command, in accordance with an embodiment of the present invention. Although system 300 includes elements depicting software components, such as integrators, summation units, limiters, and switches, system 300 is not limited to a software implementation and can be implemented in hardware using hardware components or hardware and software components. System 300 includes airspeed command module 310, pylon trim position module 320, dynamic pylon position module 330, and pylon position module 340.

Airspeed command module 310 receives an airspeed command signal for the tiltrotor aircraft and converts the airspeed command signal to the airspeed command. The airspeed command signal can be, but is not limited to, a control stick input from a pilot, a control stick input from an operator of a flight control box, or a command from an operator of a ground control station. If the airspeed command signal is control stick input 350, airspeed command module 310 converts control stick input 350 to the airspeed command by adjusting the signal amplitude using gain 311, and integrating the average signal using integrator 312 to produce the airspeed command.

If the airspeed command signal is command 360, airspeed command module 310 converts command 360 to the airspeed command by calculating a difference between command 360 and a previous airspeed command using summation unit 313, limits the amplitude of the difference using limiter 314, and integrates the difference using integrator 312 to produce the airspeed command. A summation unit, such as 313, can be used to add or subtract inputs. The airspeed command signal is selected using switch 315, for example. If the airspeed command signal is a pre-programmed maneuver, airspeed command module 310 converts the maneuver to the airspeed command by executing an algorithm describing the pre-programmed maneuver on a flight control computer.

Pylon trim position module 320 receives the airspeed command from airspeed command module 310 and converts the airspeed command to a pylon trim position. If the tiltrotor is accelerating, pylon trim position module 320 converts the airspeed command to the pylon trim position by searching lookup table 321 for a lookup table pylon trim position corresponding to the airspeed command and rate limiting the lookup table pylon trim position using limiter 322 to produce the pylon trim position. If the tiltrotor is decelerating, pylon trim position module 320 converts the airspeed command to the pylon trim position by searching lookup table 321 for a pylon trim position corresponding to the airspeed command, searching a deceleration lookup table 323 for a deceleration lookup table pylon trim position corresponding to the airspeed command, calculating a difference between the lookup table pylon trim position using summation unit 324 and the deceleration lookup table pylon trim position, and rate limiting the difference to produce the pylon trim position using limiter 322. Switch 325 is used to select deceleration lookup table 323.

Dynamic pylon position module 330 receives the airspeed command from airspeed command module 310, calculates an airspeed error from a difference between the airspeed command and measured airspeed 370 using summation unit 331, and converts the airspeed error to a dynamic pylon position. Dynamic pylon position module 330 adjusts the first signal level for integrator 334 by using gain 332. Dynamic pylon position module 330 adjusts the second signal level using gain 333. Dynamic pylon position module 330 integrates the first signal to produce an integrated error using integrator 334. Finally, dynamic pylon position module 330 sums the second signal and the integrated first signal using summation unit 335 to produce the dynamic pylon position.

Pylon position module 340 receives pylon trim position from pylon trim position module 320 and the dynamic pylon position from dynamic pylon position module 330 and calculates position of the pylon 380 from the pylon trim position and the dynamic pylon position. Pylon position module 340 calculates position of the pylon 380 from a difference between the pylon trim position and the dynamic pylon position using summation unit 341.

In accordance with an embodiment of the present invention, instructions (i.e., a software program) configured to be executed by a processor to perform a method are stored on a computer-readable medium. The computer-readable medium can be a device that stores digital information. For example, a computer-readable medium includes a compact disc read-only memory (CD-ROM) as is known in the art for storing software, or any other form of data storage. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can increase the efficiency of operation during the conversion process of a tiltrotor aircraft, while flying constantly at any airspeed inside of the conversion corridor. Systems and methods for automatic conversion control reduce the workload for pilots of manned tiltrotor aircraft and reduce the probability of pilot or operator error for both manned and unmanned aircraft.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for automatically controlling the conversion of a tiltrotor aircraft, comprising:
   receiving an airspeed command for the tiltrotor aircraft;
   converting the airspeed command to a pylon position;
   calculating a difference between the airspeed command and a measured airspeed;
   converting the difference to a dynamic pylon position;
   calculating a total pylon position from the pylon position and the dynamic pylon position; and
   moving a pylon of the tiltrotor aircraft to the total pylon position.

2. The method of claim 1, wherein the receiving the airspeed command step comprises receiving control stick input from a pilot and converting it to the airspeed command.

3. The method of claim 1, wherein the receiving the airspeed command step comprises one of receiving control stick input from an operator of a flight control box and converting it to the airspeed command, receiving a command from an operator of a ground control station and converting it to the airspeed command, and receiving a command from a pre-programmed automated maneuver.

4. The method of claim 3, wherein the automated maneuver comprises an algorithm stored on a flight control computer, wherein the algorithm comprises one of a circle mode, a return mode, a stall recovery, and a navigational mode.

5. The method of claim 1, wherein the converting the airspeed command to the pylon position step comprises searching a lookup table for the pylon position corresponding to the airspeed command.

6. The method of claim 5, wherein if the tiltrotor aircraft is decelerating, the converting the airspeed command to the pylon position step comprises searching a deceleration lookup table for a deceleration pylon position corresponding to the airspeed command and calculating a difference between the pylon position and the deceleration pylon position to produce the pylon position.

7. The method of claim 1, further comprising controlling a flap position of the tiltrotor aircraft as a function of the total pylon position and the airspeed command.

8. The method of claim 7, wherein the controlling the flap position step comprises searching a flap lookup table as a function of total pylon for a pylon flap position corresponding to the total pylon position, searching an flap lookup table that is a function of airspeed command for an airspeed flap position corresponding to the airspeed command, and adding the pylon flap position and the airspeed flap position to produce the flap position.

9. A method for calculating a position of a pylon of a tiltrotor aircraft based on an airspeed command, comprising:
   receiving an airspeed command signal for the tiltrotor aircraft;
   converting the airspeed command signal to the airspeed command;
   converting the airspeed command to a pylon trim position;
   calculating an airspeed error from a difference between the airspeed command and a measured airspeed;
   converting the airspeed error to a dynamic pylon position; and
   calculating by a processor the total position of the pylon from the pylon trim position and the dynamic pylon position.

10. The method of claim 9, wherein the airspeed command signal is one of a control stick input from a pilot, a control stick input from an operator of a flight control box, a command from an operator of a ground control station, and a command from a pre-programmed automated maneuver.

11. The method of claim 9, wherein the converting the airspeed command signal to the airspeed command step comprises:
    if the airspeed command signal comprises a control stick input, selecting a signal level and integrating the signal level to produce the airspeed command,
    if the airspeed command signal comprises a command, calculating a difference between the command and a previous airspeed command, limiting the amplitude of the difference and integrating the difference to produce the airspeed command, and
    if the airspeed command signal comprises a pre-programmed maneuver, executing an algorithm describing the pre-programmed maneuver on a flight control computer to produce the airspeed command.

12. The method of claim 9, wherein the converting the airspeed command to the pylon trim position step comprises:
    if the tiltrotor is accelerating, searching a lookup table for a lookup table pylon trim position corresponding to the airspeed command and rate limiting the lookup table pylon trim position to produce the pylon trim position, and
    if the tiltrotor is decelerating, searching a lookup table for a lookup table pylon trim position corresponding to the airspeed command, searching a deceleration lookup table for a deceleration lookup table pylon trim position corresponding to the airspeed command, calculating a difference between the lookup table pylon trim position and the deceleration lookup table pylon trim position, and rate limiting the difference to produce the pylon trim position.

13. The method of claim 9, wherein the converting the airspeed error to the dynamic pylon position step comprises:
    computing the airspeed error by taking a difference between the airspeed command and the airspeed feedback,
    adjusting the airspeed error to create a proportional command,
    adjusting the airspeed error and integrating the airspeed error to create an integral command, and summing the proportional command and the integral command to produce the dynamic pylon position.

14. The method of claim 9, wherein the calculating the total position of the pylon from the pylon trim position and the dynamic pylon position step comprises:

calculating the total position of the pylon from a difference between the pylon trim position and the dynamic pylon position.

* * * * *